(12) United States Patent
Dilzer et al.

(10) Patent No.: US 7,938,209 B2
(45) Date of Patent: May 10, 2011

(54) METHOD AND DEVICE FOR ADAPTING A CLUTCH IN A HYBRID DRIVE TRAIN OF A VEHICLE

(75) Inventors: Martin Dilzer, Buehl (DE); Michael Reuschel, Otterweiher (DE); Thomas Eggert, Graz (AT)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 164 days.

(21) Appl. No.: 12/471,819

(22) Filed: May 26, 2009

(65) Prior Publication Data

US 2009/0255743 A1 Oct. 15, 2009

Related U.S. Application Data

(63) Continuation of application No. PCT/DE2007/002010, filed on Nov. 8, 2007.

(30) Foreign Application Priority Data

Nov. 27, 2006 (DE) .................. 10 2006 055 783

(51) Int. Cl.
*B60W 20/00* (2006.01)
(52) U.S. Cl. ..................... 180/65.28; 903/946
(58) Field of Classification Search .......... 180/65.28, 180/65.225, 65.23, 65.25; 903/946
See application file for complete search history.

(56) References Cited

U.S. PATENT DOCUMENTS

| | | | | |
|---|---|---|---|---|
| 5,916,061 A * | 6/1999 | Koyama et al. | ............. | 477/175 |
| 6,018,198 A * | 1/2000 | Tsuzuki et al. | ............. | 290/17 |
| 6,364,807 B1 * | 4/2002 | Koneda et al. | ............. | 477/5 |
| 6,558,290 B2 * | 5/2003 | Phillips et al. | ............. | 477/5 |
| 6,849,026 B2 * | 2/2005 | Sakamoto et al. | ............. | 477/5 |
| 6,889,645 B2 * | 5/2005 | Tumback et al. | ............. | 123/179.3 |
| 6,939,265 B2 * | 9/2005 | Rustige et al. | ............. | 477/84 |
| 7,273,119 B2 * | 9/2007 | Tsuneyoshi et al. | ............. | 180/65.28 |
| 7,367,415 B2 * | 5/2008 | Oliver et al. | ............. | 180/65.275 |
| 7,370,715 B2 * | 5/2008 | Colvin et al. | ............. | 180/65.28 |
| 7,377,344 B2 * | 5/2008 | Barske | ............. | 180/65.28 |
| 7,426,972 B2 * | 9/2008 | Tabata et al. | ............. | 180/65.22 |
| 7,637,842 B2 * | 12/2009 | Tamai et al. | ............. | 477/6 |
| 7,770,678 B2 * | 8/2010 | Nozaki et al. | ............. | 180/65.6 |
| 7,784,575 B2 * | 8/2010 | Yamanaka et al. | ............. | 180/65.275 |
| 7,824,307 B2 * | 11/2010 | Matsubara et al. | ............. | 477/5 |
| 2008/0189018 A1 * | 8/2008 | Lang et al. | ............. | 701/54 |
| 2009/0037060 A1 * | 2/2009 | Carlhammar et al. | ............. | 701/54 |

FOREIGN PATENT DOCUMENTS

| DE | 198 12 629 A | 9/1999 |
|---|---|---|
| DE | 102 14 813 A | 10/2002 |
| DE | 103 49 445 XY | 5/2004 |
| WO | 03/098076 YA | 11/2003 |

* cited by examiner

*Primary Examiner* — Jeffrey J Restifo
(74) *Attorney, Agent, or Firm* — Lucas & Mercanti, LLP

(57) ABSTRACT

A method for adapting torque characteristic in a disengaging clutch arranged in a vehicle hybrid drive train between an internal combustion engine and an electrical machine connected to a driven wheel, include the following steps: deciding the engine can be disconnected; switching the engine off and opening the clutch; detecting the time gradient of rotational speed of the engine with it switched off and the clutch opened; partially closing the clutch when rotational speed of the engine falls below a predetermined value, and detecting the time gradient of rotational speed of the engine with the clutch partially closed; determining the clutch torque transmitted by the partially closed clutch by evaluating detected time gradients of rotational speed of the engine; and adapting the characteristic of the clutch with the aid of the determined clutch torque transmitted by the partially closed clutch.

6 Claims, 2 Drawing Sheets

METHOD AND DEVICE FOR ADAPTING A CLUTCH IN A HYBRID DRIVE TRAIN OF A VEHICLE

This application is a 371 of PCT/DE2007/002010 filed Nov. 8, 2007, which in turn claims the priority of DE 10 2006 055 783.2 filed Nov. 27, 2006, the priority of both applications is hereby claimed and both applications are incorporated by reference herein.

The invention relates to a method and a device for adapting a disengaging clutch arranged in a vehicle hybrid drive train between an internal combustion engine and an electrical machine that can be connected to at least one driven vehicle wheel.

The driving of such a disengaging clutch requires high accuracy in order to ensure a comfortable restarting of the internal combustion engine with the aid of the electrical machine. Accurate knowledge of, for example, the disengagement point of the clutch is advantageous for this purpose.

The following conflict of aims is to be solved for the decoupling or disengagement of the internal combustion engine in those operating phases in which the internal combustion engine can be stopped:

the disengaging clutch should not transmit any residual drag torque, so that no unnecessary drag losses arise.

the disengaging clutch should not be opened wider than up to the disengagement point, since any possible overtravel has a negative influence on the time critical closing operation for restarting the internal combustion engine.

Known for the purpose of determining the disengagement point of the clutch is an adaptation routine in the case of which the electrical machine is brought to a rotational speed of, for example, 500 rpm in stop phases of the vehicle, and then the clutch is closed slowly against the stopped internal combustion engine. Extensive power losses that have to be applied by the electrical machine or its energy accumulators arise during this operation, in particular in drive trains in the case of which the electrical machine is connected to a vehicle wheel via a converter and a gearbox. An impairment of comfort owing to noises and vibrations produced results in addition to these negative influences on the energy balance.

DE 40 11 850 A1 discloses a method for adapting an automated friction clutch, active between a drive machine and a gearbox, in a conventional, non-hybrid drive train, in the case of which drive train, the drive machine rotating at idling speed and the gearbox in neutral, the clutch is closed at a defined rate of speed from its disengaged or fully open position up to a position in which, although being driven, the transmission input shaft rotates at a rotational speed below the idling speed of the drive machine, and a specific gradient of the speed drive shaft is established. The engagement travel of the clutch can be adapted on the basis of this gradient in order to obtain a standard engagement point.

It is the object of the invention to specify a possible way in which the torque characteristic in a disengaging clutch arranged in a vehicle hybrid drive train between an internal combustion engine and an electrical machine connected to at least one driven vehicle wheel can be adapted, particularly in the range of low torques in a way that is advantageous in terms of energy, and without impairing comfort.

This object is achieved with the features of claim 1. As a result of the invention, the torque characteristic of the disengaging clutch can always be adapted whenever the internal combustion engine is not required to drive the vehicle and is stopped. Such operating phases occur comparatively frequently. The adaptation of the torque characteristic in overrun mode of the internal combustion engine has the advantage that the updated torque characteristic is available for a subsequent traction mode or the starting of the internal combustion engine. An adaptation of the clutch characteristic in traction mode for the range of low torques is only rarely possible. Furthermore, adaptations based on the torque signal of the internal combustion engine in its traction range are possible only with limited accuracy at low torques.

An inventive method for adapting the torque characteristic in a disengaging clutch arranged in a vehicle hybrid drive train between an internal combustion engine and an electrical machine that can be connected to at least one driven vehicle wheel comprises the following steps:

deciding that the internal combustion engine can be disconnected, switching off the internal combustion engine and opening the disengaging clutch, detecting the time gradient of the speed of the internal combustion engine with switched off internal combustion engine and opened disengaging clutch, partially closing the disengaging clutch as soon as the speed of the internal combustion engine falls below a predetermined value, and detecting the time gradient of the rotational speed of the internal combustion engine with partially closed clutch, determining the clutch torque transmitted by the partially closed disengaging clutch by evaluating the detected time gradients of the rotational speed of the internal combustion engine, and adapting the characteristic of the disengaging clutch with the aid of the determined clutch torque transmitted by the partially closed disengaging clutch.

The predetermined value of the speed of the internal combustion engine is advantageously approximately 500 rpm, that is to say it lies far below the idling speed, and the clutch torque of the partially closed clutch is approximately 10 Nm, that is to say would at most cause the vehicle to creep.

The clutch is advantageously fully opened after the partial closure such that the rotational speed of the internal combustion engine drops to zero.

A device for adapting the torque characteristic in a disengaging clutch arranged in a vehicle hybrid drive train between an internal combustion engine and an electrical machine that can be connected to at least one driven vehicle wheel includes a speed sensor for determining the rotational speed of the internal combustion engine, a clutch actuator for actuating the disengaging clutch, an electronic control device for controlling the operation of the internal combustion engine, of the electrical machine and of the clutch actuator as a function of operating parameters of the vehicle hybrid drive train and at least one program that is stored in the electronic control device and includes a clutch characteristic and in accordance with which the clutch actuator is controlled in order to transmit predetermined clutch torques by means of the disengaging clutch, the electronic control device including an adaptation program in accordance with which the clutch characteristic is adapted in accordance with a method as claimed in one of the preceding claims.

The electrical machine can, for example, be arranged between the disengaging clutch and a torque converter that is connected to at least one vehicle wheel via a gearbox with variable transmission ratio.

The invention, which can advantageously be used for all hybrid drive trains in the case of which the internal combustion engine is temporarily stopped by opening a disengaging clutch and is cranked or started by closing the disengaging clutch is explained below with the aid of schematics by way of example and with further details.

In the figures:

FIG. 1 shows a schematic block diagram of an exemplary vehicle hybrid drive train with elements relating to its control.

Figure 1:
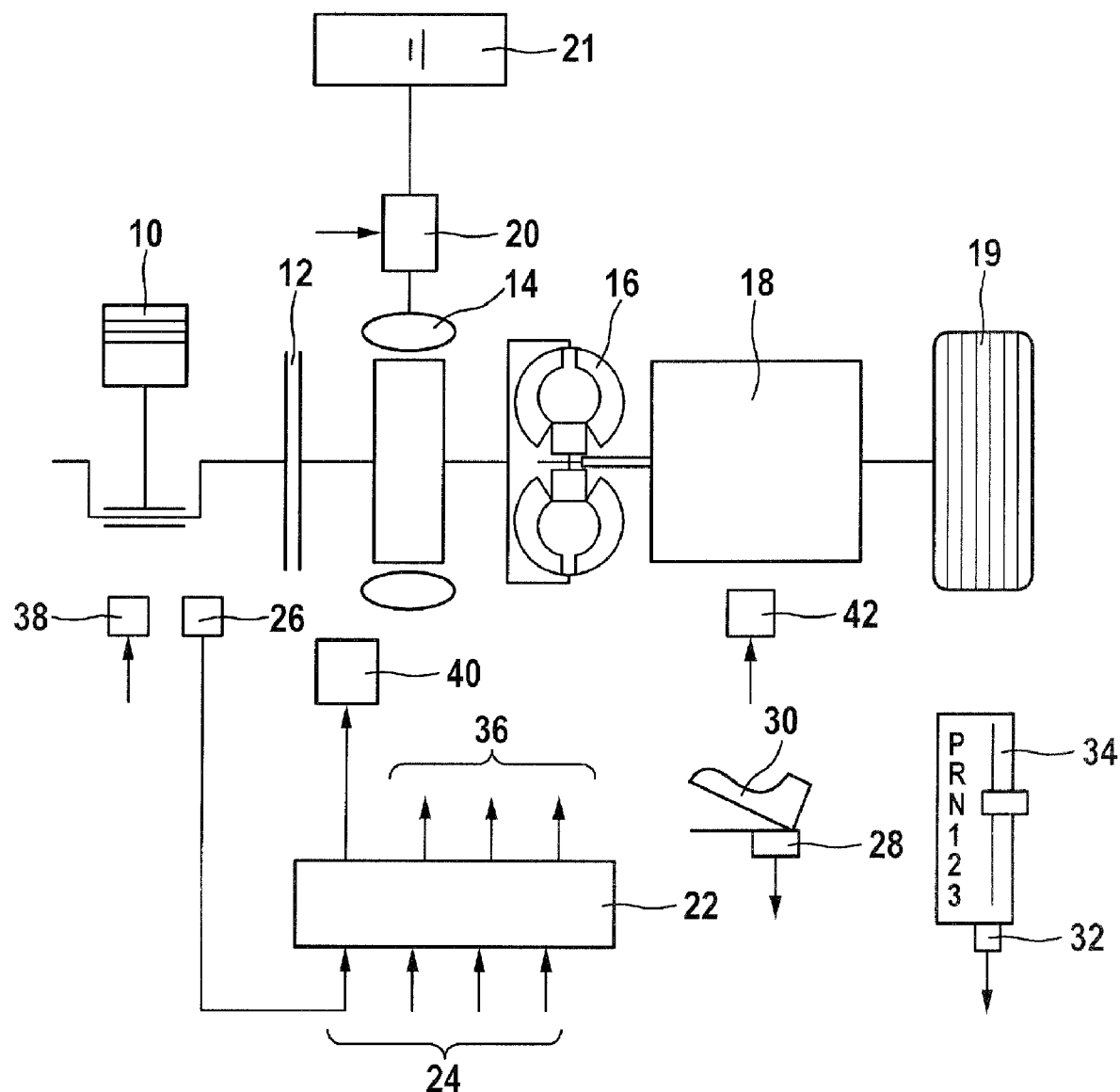
FIG. 1 shows a block diagram of a vehicle hybrid drive train with elements relating to its control.

An internal combustion engine 10 is connected via a disengaging clutch 12 to an electrical machine 14 which can be operated both as generator and as a drive motor.

Via a torque converter 16, for example a hydraulic torque converter, the electrical machine 14 is connected to an automatic gearbox 18, which is, in turn, connected to at least one vehicle drive wheel 19.

The electrical machine 14 is connected via a control unit 20 to an energy accumulator 21, for example a rechargeable battery.

The purpose of controlling the drive train is served by an electronic control device 22 with a microprocessor and storage devices in which programs are stored in accordance with which actuators are controlled as a function of operating parameters.

Sensors connected to inputs 24 of the control device 22 and intended for detecting operating parameters of the drive train are, for example, a speed sensor 26 for detecting the rotational speed of the internal combustion engine 10, a position sensor 28 for detecting the position of a gas pedal 30, a position sensor 32 for detecting the position of a driving program selector 34, as well as further sensors (not illustrated).

Outputs 36 of the electronic control device 22 are connected to a power actuator element 38 or an actuator for actuating it, a clutch actuator 40 for actuating the clutch, a transmission actuator 42 for actuating the gearbox 18, the control unit 20 for controlling the operation of the electrical machine 14 as generator or motor, as well as further actuators, if appropriate.

The design and function of the previously described arrangement are known per se. The described arrangement can be modified in this case in multivarious ways. The converter 16 can be a fully openable start-up clutch and the gearbox 18 can be a gearbox with continuously variable transmission ratio etc.

Figure 2:
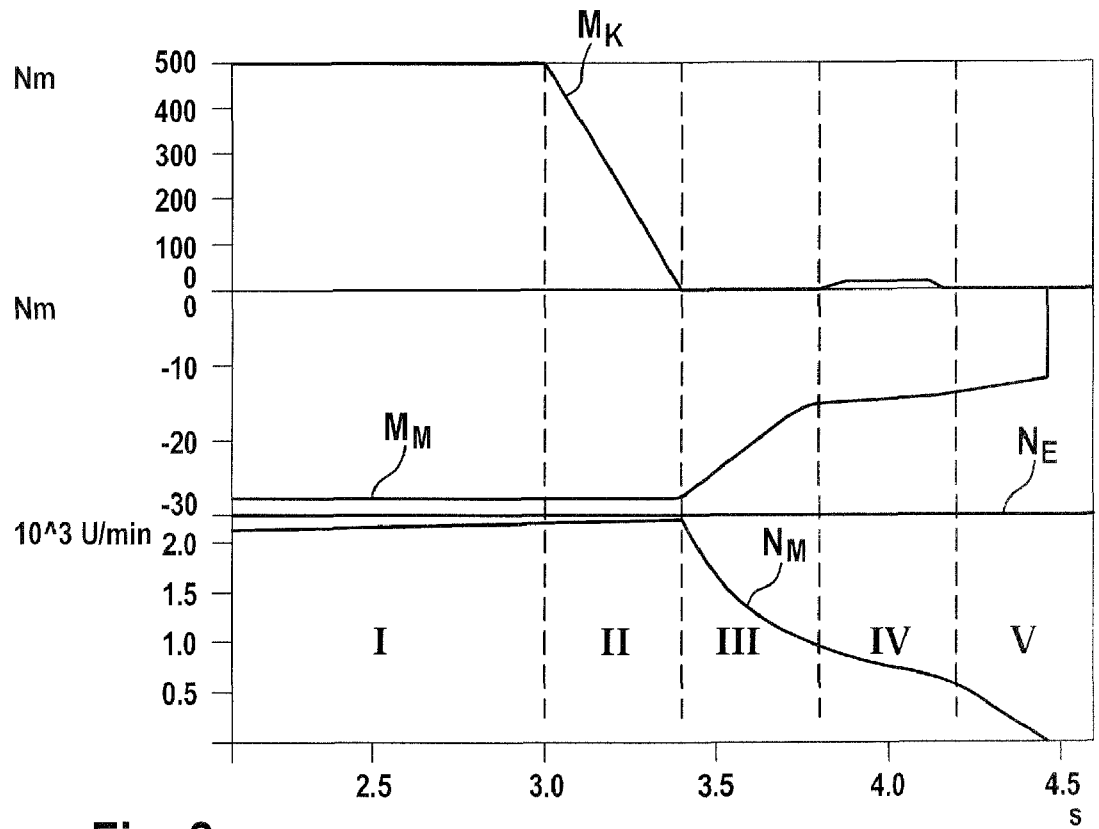
FIG. 2 shows characteristics for explaining the inventive method in the case of transition to the recovery of braking energy.

In operating states in which the internal combustion engine 10 is not required to drive the vehicle, for example in low load mode given adequate filling of the energy accumulator 21 is adequately filled, or in braking or overrun mode, as well as in stop and go traffic, the internal combustion engine 10 can be switched off in a way known per se while the disengaging clutch 12 is simultaneously opened. Accurate control of the disengaging clutch 12 is important for reactivating the internal combustion engine as smoothly as possible, said engine advantageously being designed with a low moment of inertia by virtue of the fact that the rotor of the electrical machine 14 forms at least a portion of the flywheel mass. To this end, the characteristic of the clutch that specifies the position of an actuating element, actuated by the clutch actuator 40, as a function of the torque that can be transmitted by the clutch, is adapted or updated as follows in accordance with the invention:

FIG. 2 is used to explain a method for adapting the clutch characteristic in the case of which a transition is made from a normal drive mode with closed disengaging clutch to a drive mode in which the internal combustion engine is switched off and is electrically braked, that is to say kinetic energy of the vehicle is converted by the electrical machine 14 into electrical energy that is stored in the energy accumulator 21.

The characteristic denoted by $M_K$ gives the torque in Nm that can be transmitted by the disengaging clutch 12, the characteristic denoted by $M_M$ gives the torque in Nm acting on the crankshaft of the internal combustion engine 10, the curve emitted by $N_E$ gives the rotational speed of the electrical machine 14, and the curve denoted by $N_M$ gives the speed of the internal combustion engine 10 in $10^3$ rpm, in each case as a function of time.

The diagram is divided into five operating areas I to V by vertical dotted lines.

It may be assumed that driving is still hybrid in area I, that is to say a transition is made from a driving state in which the internal combustion engine 10 is driving the vehicle into the operating area I in which the internal combustion engine 10 is running in overrun mode, that is to say the vehicle is being braked with a torque of somewhat under 30 Nm. The control device 22 then decides that a transition is being made to the recuperation mode in which the vehicle is braked by the electrical machine 14 and the internal combustion engine 10 is separated or disconnected by opening the disengaging clutch 12. The electrical machine is driven in this case as generator in order to reaccumulate braking energy in the energy accumulator 21, the braking power being controlled via the control unit 20. Carried out at the instant of approximately 3.0 seconds is the transition to the operating area II, in which the disengaging clutch 12 is opened and its transmissible torque drops to zero. In doing so, the drag torque of the internal combustion engine 10 does not change markedly at first. The drag torque of the internal combustion engine does not change until the rotational speed thereof decreases in the operating area III as a consequence of the fully opened clutch (the fuel feed to the internal combustion engine is switched off during the operating area II).

The gradient of the rotational speed of the internal combustion engine is determined during the operating area III. Since the drag torque of the internal combustion engine changes continuously with the rotational speed thereof (it holds that: $dM_M/dN_M \sim 10$ Nm/1000 rpm), the gradient of the engine speed can be determined relatively accurately. An influence as a consequence of consumers being switched on/switched off is not expected, since in the case of a hybrid vehicle consumers are generally driven electrically, that is to say not directly by the internal combustion engine.

As soon as the rotational speed of the internal combustion engine has dropped at the end of the operating area III to a predetermined rotational speed (for example 500 rpm), the disengaging clutch 12 is applied partially in the closing direction in the operating area IV, a clutch torque of approximately 10 Nm sufficing in order to attain a clearly measurable change in the speed gradient of the torsional force machine. This disturbance is small enough not to have any negative influence on comfort. Owing to the incipient flattening of the speed gradient of the internal combustion engine in the operating area IV, it is possible to determine the point of application of the clutch relatively accurately. During the holding phase of the partial closure of the clutch in the operating area IV, which lasts, for example, between 150 ms and 200 ms, the applied clutch torque can be estimated accurately with the aid of the change in the gradient of the rotational speed of the internal combustion engine:

It holds at:

$$d^2 N_M / dt^2 \approx \frac{M_M + M_K}{J_{KW} + J_{Kprimary}}$$

in which:
$J_{KW}$ is the moment of inertia acting on the crankshaft of the internal combustion engine, and
$J_{Kprimary}$ is the primary side moment of inertia of the clutch.

After the point of application of the clutch or the clutch torque required for measured change in the speed gradient of the internal combustion engine has been determined accurately in the operating area IV, and the clutch characteristic can therefore be adapted, the clutch is fully opened again in the operating area V such that the engine speed $N_M$ drops to zero and it is possible to brake electrically in a way known per se.

Figure 3:
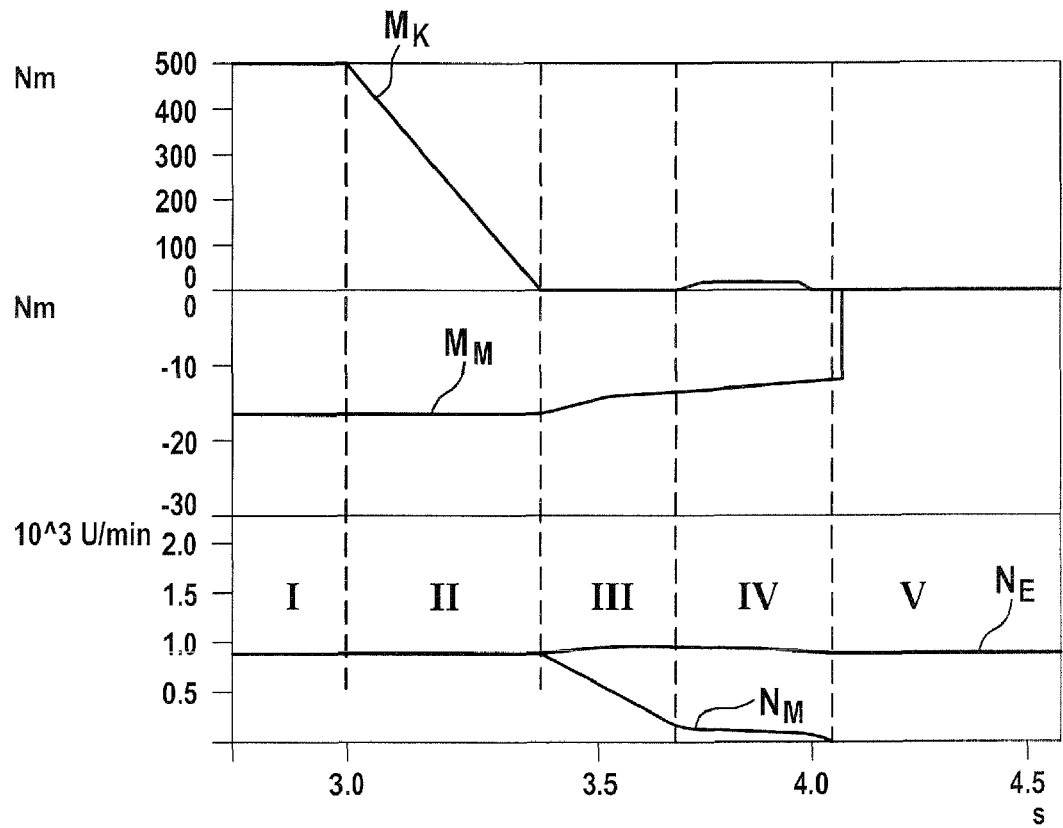
FIG. 3 shows characteristics for explaining the inventive method in the case of the transition to stop/start mode.

The illustration of FIG. 3 corresponds to that of FIG. 2, and shows the disengagement of the internal combustion engine in start/stop mode, in which the internal combustion engine is running in the operating area I only at its idling speed $N_M$ of approximately 900 rpm, and the vehicle is in overrun mode ($M_M$=−18 Nm). The operating area I could also be an operating phase in which the internal combustion engine is running not in the overrun mode of the vehicle but when the vehicle is stopped and at idling speed, that is to say is outputting only a very low positive torque.

Again, in the operating area IV the disengaging clutch is slightly closed such that it is possible to infer the torque transmitted by the disengaging clutch from the change in the gradient of the drop in rotational speed of the internal combustion engine.

An adaptation routine such as has been described with the aid of FIGS. 2 and 3 can be carried out each time the internal combustion engine, but not the vehicle, is stopped, or can be performed only at predetermined intervals with reference to the period of operation of the vehicle, the number of actuations of the clutch, etc. The clutch characteristic can be adapted in each case in a way known per se by virtue of the fact that a point (application point) is currently determined with the associated actuation position, and the characteristic can be correspondingly shifted.

LIST OF REFERENCE NUMERALS

10 Internal combustion engine
12 Disengaging clutch
14 Electrical machine
16 Torque converter
18 Gearbox
19 Vehicle drive wheel
20 Control unit
21 Energy accumulator
22 Electronic control device
24 Inputs
26 Speed sensor
28 Position sensor
30 Gas pedal
32 Position sensor
34 Driving program selector
36 Outputs
38 Power actuator element
40 Clutch actuator
42 Transmission actuator

The invention claimed is:

1. A method for adapting torque characteristic in a disengaging clutch arranged in a vehicle hybrid drive train between an internal combustion engine and an electrical machine that is connected to at least one driven vehicle wheel, comprising the following steps:
   deciding that the internal combustion engine can be disconnected,
   switching off the internal combustion engine and opening the disengaging clutch,
   detecting a time gradient of rotational speed of the internal combustion engine with the internal combustion engine switched off and the disengaging clutch opened,
   partially closing the disengaging clutch as soon as the rotational speed of the internal combustion engine falls below a predetermined value, and detecting the time gradient of the rotational speed of the internal combustion engine with the disengaging clutch partially closed,
   determining clutch torque transmitted by the disengaging clutch, which is partially closed, by evaluating the time gradient, which was detected, of the rotational speed of the internal combustion engine, and
   adapting characteristics of the disengaging clutch with aid of the clutch torque transmitted by the disengaging clutch which is partially closed.

2. The method as claimed in claim 1, wherein the predetermined value of the rotational speed of the internal combustion engine is approximately 500 rpm.

3. The method as claimed in claim 1, wherein the disengaging clutch, which is partially closed, transmits a clutch torque of approximately 10 Nm.

4. The method as claimed in claim 1, wherein the disengaging clutch is fully opened after being partially closed such that the rotational speed of the internal combustion engine drops to zero.

5. A device for adapting the torque characteristic in a disengaging clutch arranged in a vehicle hybrid drive train between an internal combustion engine and an electrical machine that is connected to at least one driven vehicle wheel, including:
   a speed sensor for determining the rotational speed of the internal combustion engine,
   a clutch actuator for actuating the disengaging clutch,
   an electronic control device for controlling operation of the internal combustion engine, of the electrical machine and of the clutch actuator as a function of operating parameters of the vehicle hybrid drive train and at least one program that is stored in the electronic control device and includes a clutch characteristic and in accordance with which the clutch actuator is controlled in order to transmit predetermined clutch torques by means of the disengaging clutch, the electronic control device including an adaptation program in accordance with which the clutch characteristic is adapted in accordance with a method as claimed in claim 1.

6. The device as claimed in claim 5, wherein the electrical machine is arranged between the disengaging clutch and a torque converter that is connected to at least one vehicle wheel via a gearbox with variable transmission ratio.

* * * * *